United States Patent
Pugh (10) Patent No.: US 12,181,625 B2
(45) Date of Patent: Dec. 31, 2024

(54) DETECTION OF NEAR SUBSURFACE VOIDS THAT ARE RESISTIVE OR CONTAIN CONDUCTIVE ELEMENTS WITHIN THE VOID SPACE

(71) Applicant: Deep Imaging Technologies, Inc., Tomball, TX (US)

(72) Inventor: Trevor Keith Charles Pugh, Tomball, TX (US)

(73) Assignee: ESG SOLUTIONS GROUP, INC., Houston, TX (US)

( * ) Notice: Subject to any disclaimer, the term of this patent is extended or adjusted under 35 U.S.C. 154(b) by 183 days.

(21) Appl. No.: 17/810,463

(22) Filed: Jul. 1, 2022

(65) Prior Publication Data

US 2023/0003915 A1    Jan. 5, 2023

Related U.S. Application Data (60) Provisional application No. 63/202,972, filed on Jul. 1, 2021.

(51) Int. Cl.
*G01V 3/38* (2006.01)
*G01V 3/12* (2006.01)
*G01V 3/08* (2006.01)

(52) U.S. Cl.
CPC .............. *G01V 3/38* (2013.01); *G01V 3/12* (2013.01); *G01V 2003/085* (2013.01)

(58) Field of Classification Search
CPC . G01V 3/38; G01V 3/12; G01V 3/083; G01V 2003/085
See application file for complete search history.

(56) References Cited

U.S. PATENT DOCUMENTS

| | | | | |
|---|---|---|---|---|
| 6,822,443 B1* | 11/2004 | Dogaru | ............... | G01N 27/904 324/238 |
| 11,709,093 B1* | 7/2023 | Remillieux | ........ | G01N 29/2418 73/598 |
| 2005/0279495 A1* | 12/2005 | Chen | ...................... | G01V 3/265 166/250.1 |
| 2006/0285438 A1* | 12/2006 | Arrowsmith | .......... | G01V 1/288 367/38 |

(Continued)

OTHER PUBLICATIONS

Davydycheva Sofia et al: "Detection of clandestine tunnels in complex environments using a mobile focused-source electromagnetic data measurement and processing unit", Radar Sensor Technology XVI, SPIE, 1000 20th St. Bellingham WA 98225-6705 USA, vol. 8361, No. 1, May 11, 2012 (May 11, 2012), pp. 1-9, XP060003793, DOI: 10.1117/12.919618 [retrieved on May 3, 2012].

(Continued)

*Primary Examiner* — Lee E Rodak
*Assistant Examiner* — Demetrius R Pretlow
(74) *Attorney, Agent, or Firm* — Barnes & Thornburg LLP (57) ABSTRACT

A system and techniques for detecting near-subsurface voids in the earth use a controlled source electromagnetic transmitter and a plurality of controlled source electromagnetic receivers. Signals received by the plurality of controlled source electromagnetic receivers corresponding to signals generated by the controlled source electromagnetic transmitter are analyzed. Bi-static doublets detected in the received signals are used to identify the location of the near-subsurface voids.

17 Claims, 11 Drawing Sheets

(56) References Cited

U.S. PATENT DOCUMENTS

| | | | | |
|---|---|---|---|---|
| 2010/0332198 A1* | 12/2010 | Wahrmund | ............ | G01V 3/083 703/2 |
| 2015/0081219 A1* | 3/2015 | Pugh | ........................ | G01V 3/12 324/337 |
| 2017/0261642 A1* | 9/2017 | Li | ........................ | G01V 11/007 |

OTHER PUBLICATIONS

ISA/EPO, "International Search Report and Written Opinion," Oct. 17, 2022, 15 pages, European Patent Office, Rijswijk, Netherlands.

Neese J Wet al:"Underground Tunnel Detection using EM Waves", 2021 IEEE Texas Symposium on Wireless and Microwave Circuits and Systems (WMCS), IEEE, May 18, 2021 (May 18, 2021), pp. 1-5, XP033948619, DOI: 10.1109/WMCS52222.2021.9493226 [retrieved on Jul. 21, 2021].

St M. Saint-Amant and David W. Strangways, "Dielectric Properties of Dry, Geologic Material," Geophysics, vol. 3.5, No. 4 (Aug. 1970), p. 624-645).

Constable et al., "An introduction to marine controlled-source electromagnetic methods for hydrocarbon exploration," Geophysics, Mar.-Apr. 2007, pp. WA3-WA12, vol. 72, No. 2, Society of Exploration Geophysicists, Houston, TX, https://doi.org/10.1190/1.2432483.

Larsson, "Electromagnetics from a quasistatic perspective, " Mar. 2007, pp. 230-239, Am. J. Phys. vol. 75 No. 3, American Association of Physics Teachers, College Park, MD, https://doi.org/10.1119/1.2397095.

Niu et al., "Measurement of dielectric properties (mHz—MHz) of sedimentary rocks," SEG International Exposition and 86th Annual Meeting, 2016, pp. 3127-3132, Society of Ecplortation Geophysicistsm, Houston, TX, https://doi.org/10.1190/segam2016-13962181.1.

* cited by examiner

DETECTION OF NEAR SUBSURFACE VOIDS THAT ARE RESISTIVE OR CONTAIN CONDUCTIVE ELEMENTS WITHIN THE VOID SPACE

CROSS-REFERENCE TO RELATED APPLICATION

This Patent Application claims priority to U.S. Provisional Patent Application No. 63/202,972, filed on Jul. 1, 2021, and entitled "Method and device for the detection of near subsurface voids that are resistive or contain conductive elements within the void space." The disclosure of the prior application is considered part of and is incorporated by reference into this Patent Application.

TECHNICAL FIELD

The present invention relates to the field of geophysics, and in particular to techniques for obtaining information about void spaces in near subsurface formations.

BACKGROUND ART

Detection of near subsurface voids or karsts would be useful for numerous reasons. For example, entities positioning heavy equipment or structures have safety concerns because the heavy equipment or structures might cause the subsurface void to collapse, potentially damaging the equipment or structure or causing human injury. Other uses for void detection may include the detection of subterranean tunnels used for smuggling goods or people across borders or other lines of control. Yet other uses for void detection may include the detection of subterranean structures such as tombs or other ancient structures that may have been buried since their construction. Existing techniques such as Electrical Resistivity Tomography (ERT) and Ground Penetrating Radar (GPR) have proven insufficient for such detection.

SUMMARY OF INVENTION

In one general aspect, a system for detecting voids in a near-subsurface area of the earth comprises a controlled source electromagnetic transmitter, operatively placed on a surface of the earth; a plurality of controlled source electromagnetic receivers, synchronized with the controlled source electromagnetic transmitter, operatively distributed across the surface of the earth relative to the controlled source electromagnetic transmitter; and software for analyzing signals received by the plurality of controlled source electromagnetic receivers corresponding to signals generated by the controlled source electromagnetic transmitter, comprising: software for detecting bi-static doublets in the received signals; and software for identifying near-subsurface voids corresponding to the detected bi-static doublets.

In another general aspect, a non-transitory medium stores software for detecting near-subsurface voids in the earth, the software comprising instructions that when executed cause one or more processors to capture signals received by a plurality of controlled source electromagnetic receivers responsive to signals generated by a controlled source electromagnetic transmitter; detect bi-static doublets in the captured signals; and identify near-subsurface voids corresponding to the detected bi-static doublets.

In another general aspect, a method for detecting near-subsurface voids in the earth comprises positioning a controlled source electromagnetic transmitter on a surface of the earth; distributing a plurality of controlled source electromagnetic receivers across the surface of the earth relative to the controlled source electromagnetic transmitter, wherein the plurality of controlled source electromagnetic receivers are synchronized with the controlled source electromagnetic transmitter; generating a first signal into the earth by the controlled source electromagnetic transmitter; receiving a second signal by the plurality of controlled source electromagnetic receivers responsive to the first signal; generating a third signal by cross-correlating the second signal to the first signal; detecting bi-static doublets in the third signal; and identifying near-subsurface voids in the earth corresponding to the bi-static doublets.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form to avoid obscuring the invention. References to numbers without subscripts are understood to reference all instances of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments can implement the features and functionality described herein in software, firmware, or hardware as desired, including any combination of software, firmware, and hardware. References to daemons, drivers, engines, modules, or routines should not be considered as suggesting a limitation of the embodiment to any type of implementation. The actual specialized control hardware or software code used to implement these systems or methods is not limiting of the implementations. Thus, the operation and behavior of the systems and methods are described herein without reference to specific software code with the understanding that software and hardware can be used to implement the systems and methods based on the description herein.

The software referenced below generally comprises instructions that when executed cause one or more processors of a computer system to perform the indicated actions. The software may be stored on one or more non-transitory medium for such execution.

Although particular combinations of features are recited in the claims and disclosed in the specification, these combinations are not intended to limit the disclosure of various implementations. Features may be combined in ways not specifically recited in the claims or disclosed in the specification.

Although each dependent claim listed below may directly depend on only one claim, the disclosure of various implementations includes each dependent claim in combination with every other claim in the claim set. No element, act, or instruction used herein should be construed as critical or essential unless explicitly described as such.

In the following discussion, the use of Controlled Source Electromagnetic (CSEM) for near-subsurface void detection is described. There is a general oversimplification of modeling efforts in the CSEM world that has led to the conventional conclusion that there can be no mechanism for bi-static responses from subsurface geology using electromagnetic (EM) methods. However, recent experiments and data sets have shown that in near-surface (less than 800 m depth) environments there are weak but significant responses from the earth that exhibit the behavior of bi-static doublets that can be used for void detection as described below. Although the description below is written in terms of void detection, the same techniques may be used for detecting conductive elements, such as a large metallic object.

The proposed mechanisms for detecting bi-static doublets are related to low-frequency permittivity values that exceed those modeled for low frequencies and un-modeled drift velocities due to mineral content that act in a semiconductor manner with voltage fields present. As described in detail below, a system that places CSEM receivers in the near field of the CSEM transmitter and within a large voltage field may be used to perform these techniques. Other mechanisms that are not modeled or described in detail below may provide additional electron drift velocity components and charge mobility. The described techniques may be called Cross-Correlation Electromagnetic Tomography.

In some embodiments, the CSEM transmitter and receivers may be implemented as described in U.S. Pat. No. 9,810,804, entitled "Collecting and Transmitting Control Source Electromagnetic Signals," issued Nov. 7, 2017, U.S. Pat. No. 11,221,429, entitled "COHERENT TRANSMIT AND RECEIVER BI-STATIC ELECTROMAGNETIC GEOPHYSICAL TOMOGRAPHY," issued Jan. 11, 2022, both of which are incorporated herein by reference in its entirety for all purposes. The same equipment may be used for both near-surface and deep subsurface work, but the techniques for use of the equipment may vary.

The techniques described herein use a very long Pseudo-Random Numeric (PRN) code that is over 8191 chips long. Each bit in the pseudorandom binary sequence is known as a chip. In the example described below the PRN code comprises 16383 chips with an 8-second code period that is transmitted continuously by the controlled source electromagnetic transmitter. The PRN code creates a broad spectrum signal that is not coherent with noise sources, providing significant advantages in signal detection and signal-to-noise ratios. The spectrum may be in the low frequency range of 1 Hz to 1 KHz. In one example, the spectrum was 200 Hz-600 Hz. The use of a broad spectrum signal is required since not all of the spectrum is present in the received signal. The controlled source electromagnetic transmitter current and voltage data are recorded at the source.

An array of a plurality of surface CSEM receivers is deployed to record the response created by the CSEM transmitter providing power into the ground. Each member of the array of surface CSEM receivers thus receives a signal corresponding to the signal generated by the CSEM transmitter that is reflected from the subsurface. Each recording instrument in the CSEM transmitter and CSEM receiver array is precisely synchronized, preferably to better than 100 nanoseconds difference, across all devices with very low drift. In addition, each recording instrument has as high a sample rate as attainable, preferably at least 50,000 samples per second. Those configurations are due to the high velocity of the recorded electromagnetic response. Depending on various electrical properties of the subsurface structure, the velocity of the received signals may vary in a range of 3,000 m/sec to over 100,000 m/sec. Therefore, lower sample rates or poor synchronization would not allow the system to resolve the doublets.

Figure 1:
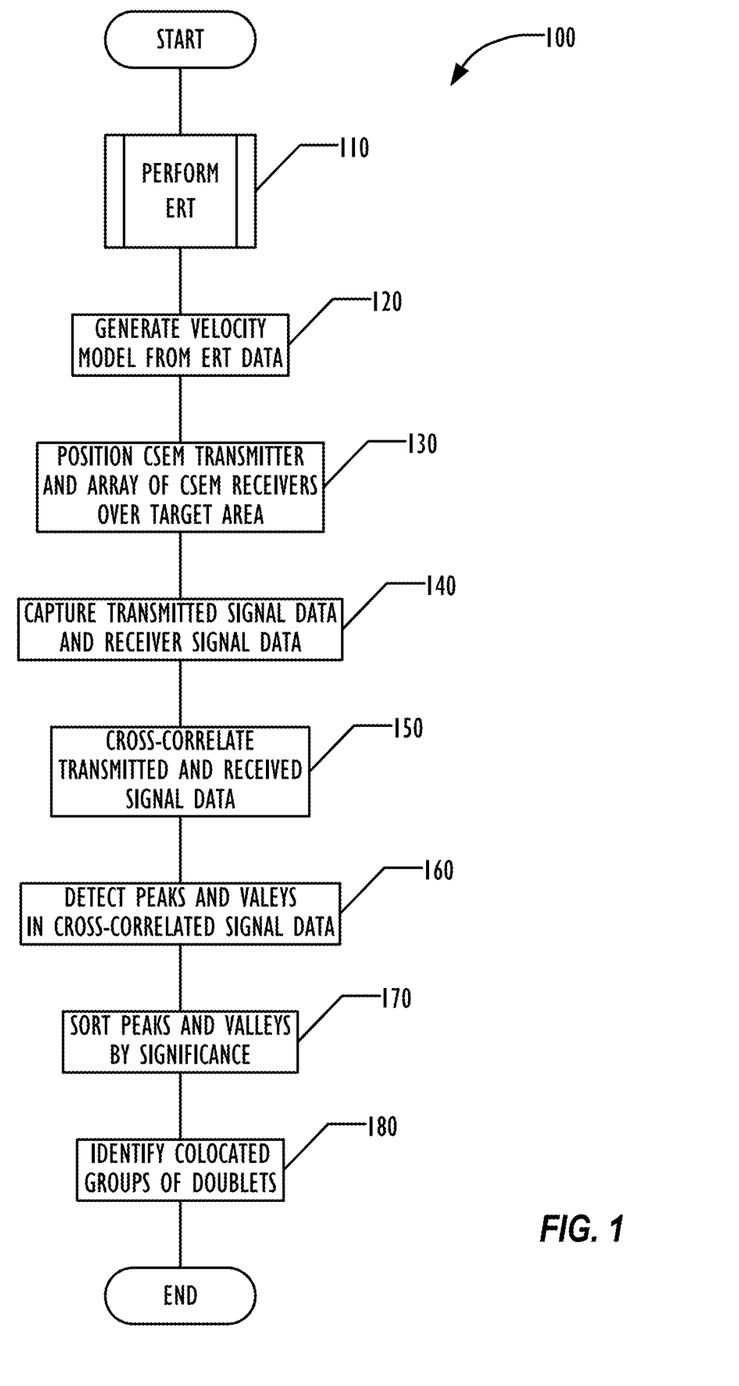
FIG. 1 is a flowchart illustrating a technique for detecting near-subsurface voids according to one embodiment.

FIG. 1 is a flowchart 100 illustrating a technique for detecting near-subsurface voids according to one embodiment.

In some embodiments, a preliminary resistivity survey of the near-surface impedances of a target area may be performed in block 110 using an electrical resistivity tomography (ERT) system. ERT systems are readily available. An example of an ERT system is the Super Sting Monitoring System from Advanced Geosciences Inc. at www.agiusa.com. The preliminary resistivity survey may be used to provide calibration markers for the cross-correlation data and also allow the creation of a velocity model from inverted ERT data in block 120 that converts time-based information into subsurface depth information. Different subsurface materials may produce significant differences in signal velocity. Techniques for creating a velocity model are well known to a person of ordinary skill in the art and need not be described further herein. People skilled in the art may also define the velocities in the very low frequency range as a pseudo velocity.

While there may be similarities between cross-correlation electromagnetic tomography data and inverted ERT data, the cross-correlation is not inverted data, but a direct measurement that only requires a velocity model. In general, the cross-correlation electromagnetic tomography techniques described here depend upon several considerations for a successful operation:

Depth: 1 m to 800 m

Subsurface impedance: <100 ohm meters. I.e., electromagnetic velocities of <100,000 m/s The subsurface feature should be below the surface but above a first low resistivity area. Generally, the subsurface feature, such as a tunnel, should have a response from all three lines of receivers, A, B, and C, where the response should be small and the time between the peaks and valleys in the cross-correlation should also be small. Obtaining a response on all three receivers A, B, and C with approximately the same time delay increases the certainty that the response is from a subsurface linear structure. Although three lines of receivers A, B, and C are described in the examples below, arrays with different numbers of lines of receivers may be used. For example, an array with six lines of receivers may provide better results for a more complex subsurface structure shape with a larger vertical extent, such as a tomb.

In block 130 the CSEM transmitter and CSEM receivers are positioned over the target area. An example of an array layout may have short CSEM receiver antenna lengths, for example, 3-meters to 12-meters, and CSEM receiver spacing may be 6-meter to 24-meter spacing depending on the estimated depth and size of the target. However, different use cases may employ different CSEM receiver antenna lengths and different spacing. The CSEM transmitter is attached to a grounded dipole that is of sufficient length to ensure that the measurement area is away from the extreme field curvature at the power-ground coupling points.

Figure 10:
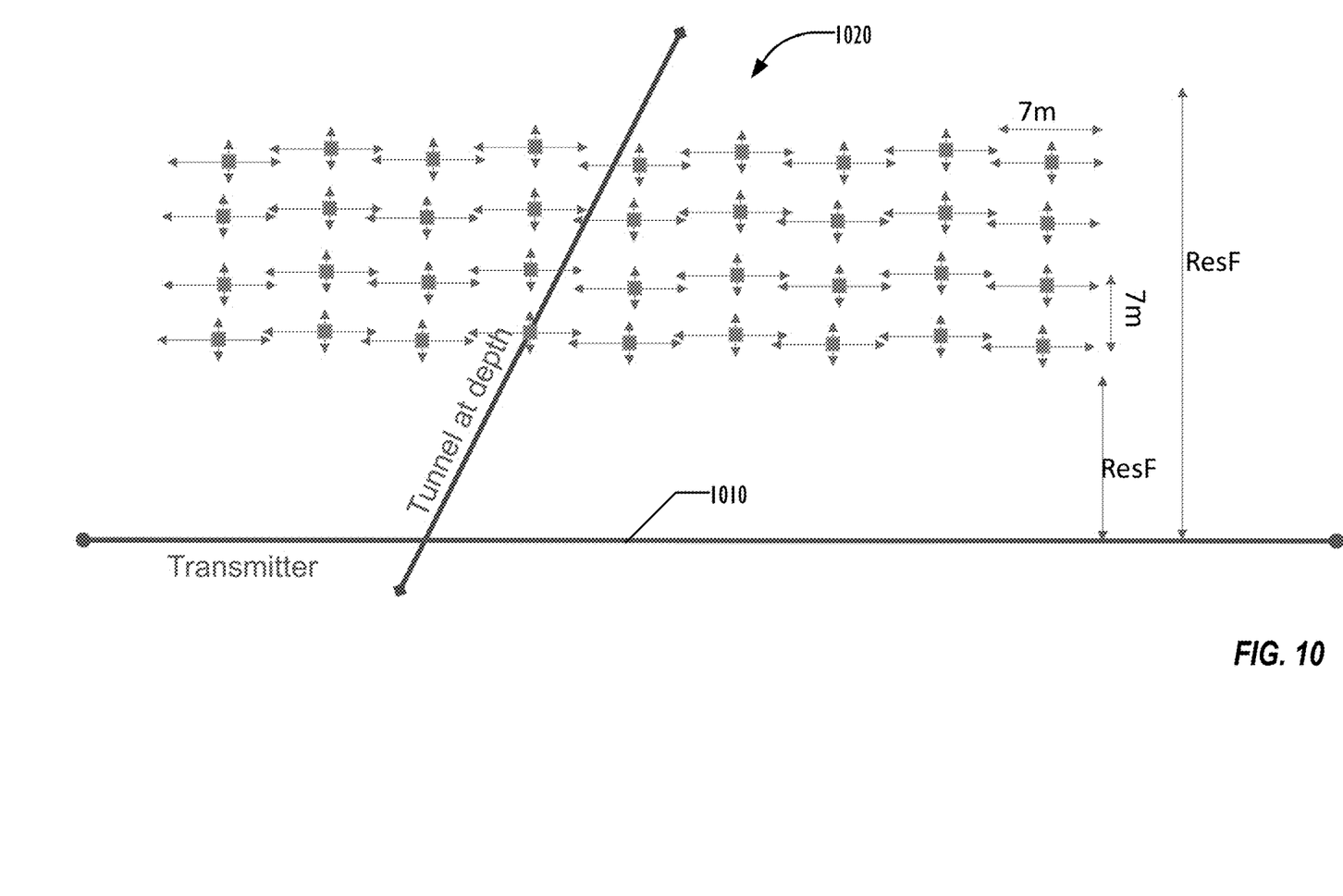
FIG. 10 is a block diagram illustrating an example layout of a transmitter and receivers for a small target.
Figure 11:
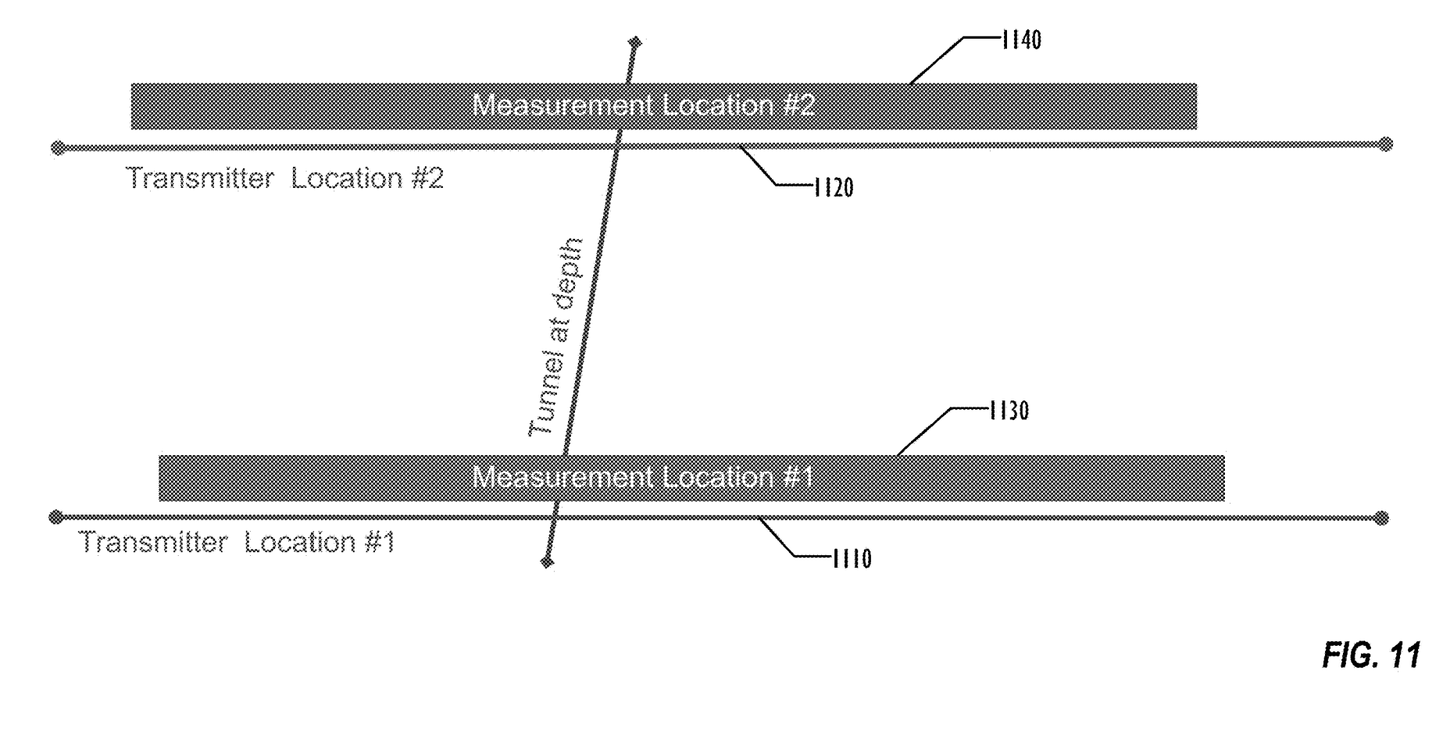
FIG. 11 is a block diagram illustrating an example layout of transmitters and receivers for a larger target.

The CSEM receivers are operatively distributed across the surface of the earth relative to a corresponding CSEM transmitter. FIG. 10 is a block diagram illustrating an example layout of the CSEM transmitter 1010 and CSEM receivers 1020 where the target area is small. For a large target area, as in the example of FIG. 11, CSEM receivers may be laid out as two strips of equipment, using two CSEM transmitters 1110, 1120 and two arrays of CSEM receivers 1130, 1140, to obtain two points in a large field for the target tunnel or other subsurface feature. If there is a deviation in the tunnel or other subsurface feature between the two distant measurement points, there may be a need for a third strip in the center of the field. There is no need to cover the whole area.

In block 140, the CSEM transmitter transmits a signal into the ground, using the PRN codes described above. The CSEM transmitter signals are recorded for later cross-correlation with the signals received by the array of CSEM receivers, which also record the received signals. The transmitted and received signal data may be stored in any desired way, as long as timestamps are associated with the signal data, as well as an identification of which CSEM receiver in the array of CSEM receivers is associated with the received signal data.

In block 150, the signal data captured from the CSEM transmitter and CSEM receivers are cross-correlated in the frequency domain, using software cross-correlation techniques. The resulting cross-correlated data produces a data set that is the cross-correlation for each CSEM receiver and CSEM transmitter across the CSEM receiver array. In one embodiment, the CSEM transmitter data may be extended by some number of frames (e.g., 3 frames) before cross-correlating the CSEM receiver data to ensure a "sweet spot" in the middle of the data. In another embodiment the data frames can be stacked in the frequency domain to provide improved signal to noise (SNR) and reduced spectral leakage prior to cross correlation. In some embodiments, phase information in the data may be unwrapped. No effort to fix any unwrap phase errors is required, as the overall result does not change.

In block 160, software may analyze the cross-correlated data for each CSEM receiver-transmitter pair set to detect peaks and valleys within the cross-correlated data. In block 170, software may sort the cross-correlated data by significance as illustrated in FIGS. 2-9. Finally, in block 180, software may identify groups of doublets that are co-located in time and space as indicating the presence of a near-subsurface void or conductive element.

The significance of a peak or valley is controlled by bin separation. In the example illustrated in the figures, peak/valley and valley/peak pairs need to be close together in time to be a small structure, such as an elongated void. Different combinations of positions along the array and timing between each doublet provide information about the shape and depth of the sub-surface void or conductive element.

In the following example data, there are three lines of receivers in the array laid east to west. The offset for each line from the transmitter is C line @10-meter, B line @15-meter, and A line @20-meter. The transmitter grounded dipole is 300 meters long.

Figure 2:
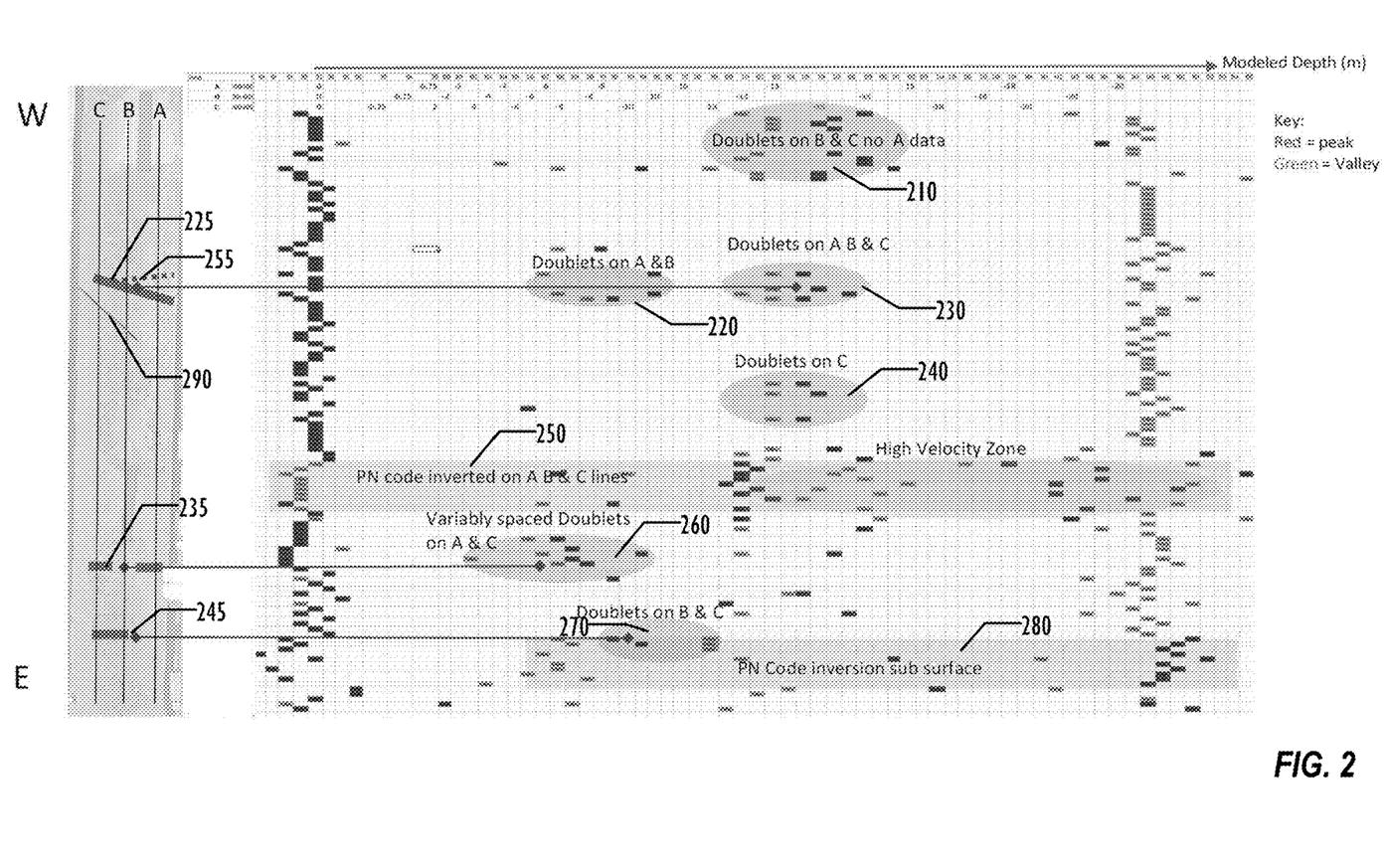
FIG. 2 is a spreadsheet and image illustrating the relationship between the cross-correlation data and position on the surface array and noted anomalies.
Figure 3:
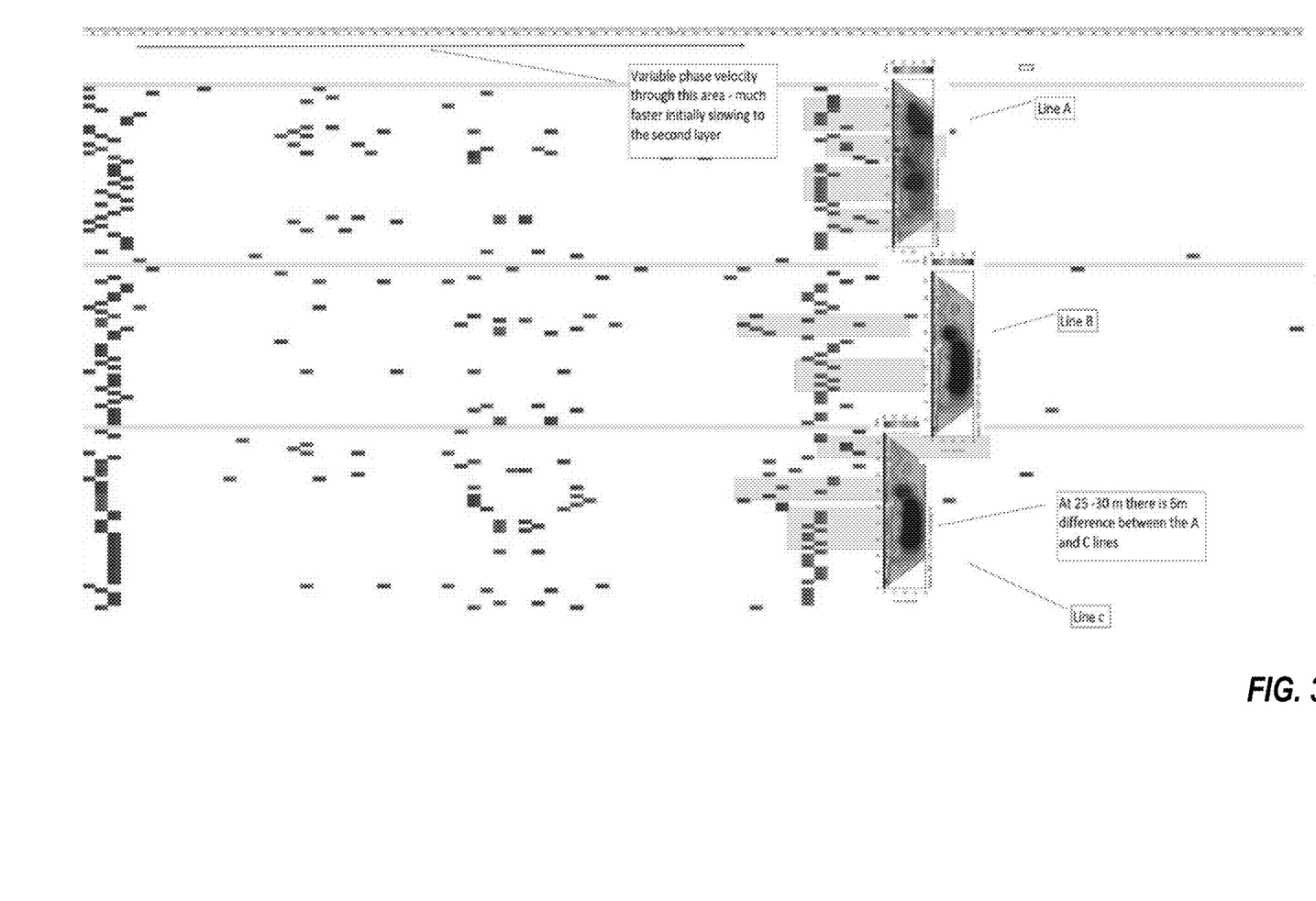
FIG. 3 is a spreadsheet and image illustrating each of the A, B, and C line data plotted without regard to North-South position and compared to resistivity data to calibrate a velocity model.

FIGS. 2 and 3 illustrate how the data can be related to the surface using a simple spreadsheet and that depth can be estimated using a velocity model. Although illustrated for simplicity in the form of a spreadsheet in the figures, any format of data storage usable by the software may be used for the analysis. In this example, an experiment was performed using the described techniques to locate some subsurface tunnels 225 and 235 that were already known to exist by the client CSEM receivers were placed at lines A, B, and C as illustrated in FIG. 2.

In FIG. 2 the actual position of an anomaly of interest is indicated approximately by the orange line mark 290 as the bi-static response is halfway between the CSEM receiver location and the CSEM transmitter. This is distinct from the expected typical EM response that would be immediately above the subsurface anomaly in this example.

In FIG. 2, area 210 illustrates the presence of doublets on receiver lines B and C, but not receiver line A. Area 220 illustrates the presence of doublets on receiver lines A and B, while area 230 illustrates doublets on receiver lines A, B, and C. Area 240 illustrates the presence of doublets on receiver line C only. Area 250 illustrates a high-velocity zone in which the PRN code was inverted on receiver lines A, B, and C. Area 260 illustrates variably spaced doublets on receiver lines A and C. Area 270 illustrates doublets on receiver lines B and C. And area 280 illustrates another PRN code inversion subsurface.

Figure 4:
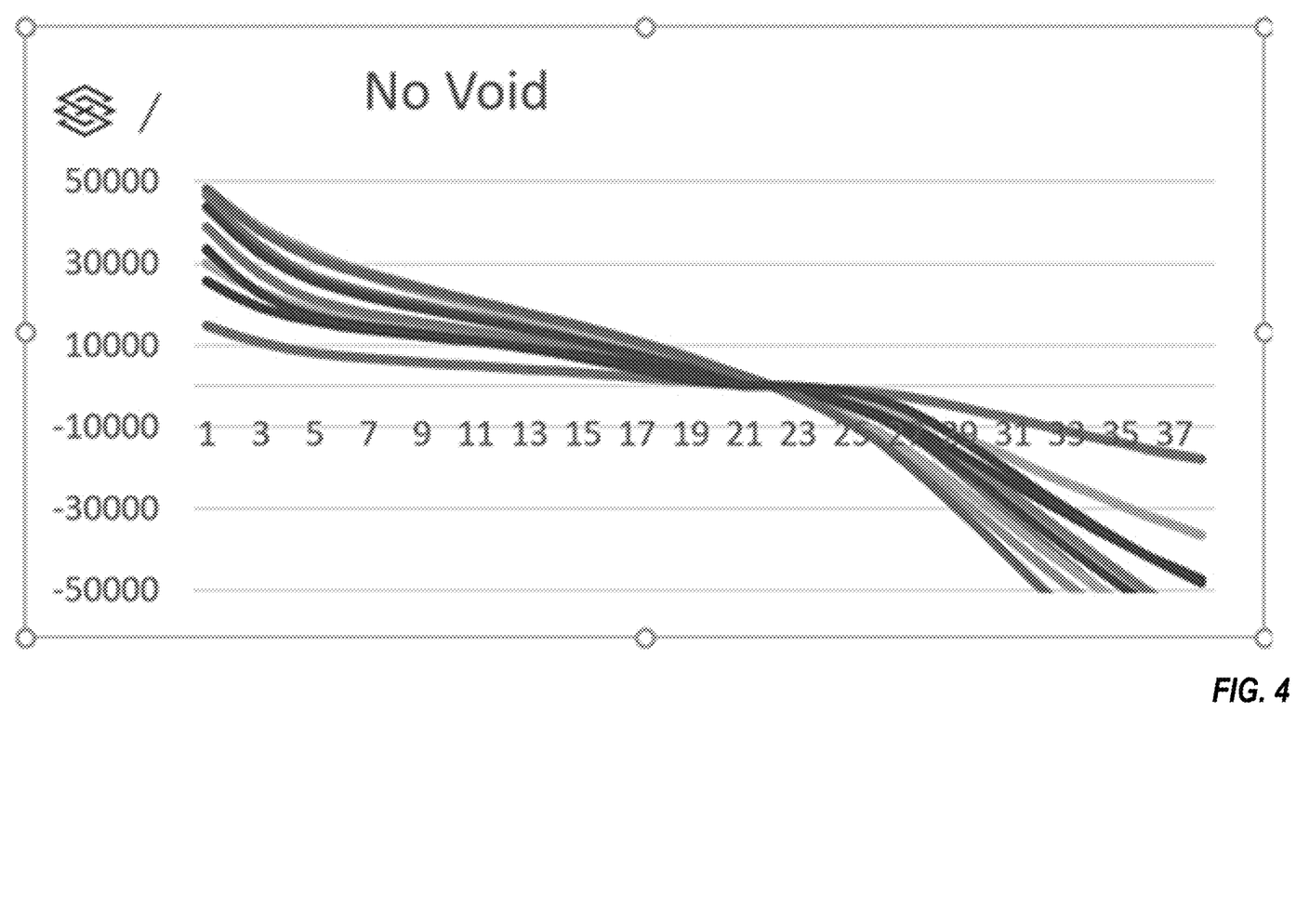
FIG. 4 is a graph illustrating a typical curve at the bin times that are equivalent to the target depth. The data does not show a void signature.
Figure 5:
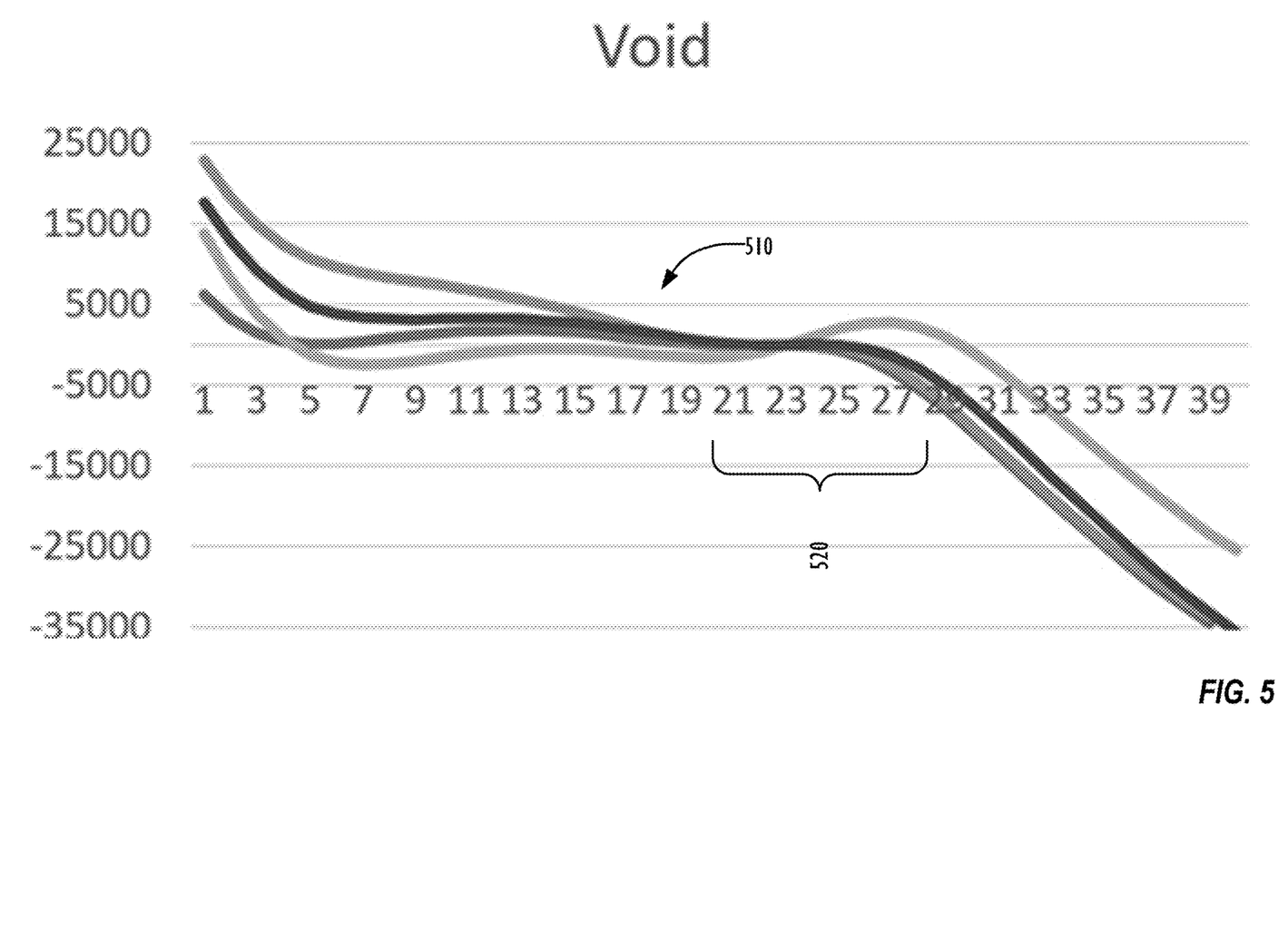
FIG. 5 is a graph illustrating a typical group of curves at the bin times that are equivalent to the target depth. The data shows a void signature.

There are two techniques to sort the cross-correlation data into useful groups that may be used to detect the near subsurface voids of interest:

The first method is qualitative and observes trace shape and makes a determination based on the quality of the trace as seen in FIGS. 4 and 5. In FIG. 4, which illustrates traces from an area with no void, the curves exhibit no relatively flat area. In FIG. 5, however, which illustrates traces from an area with a void, the curves exhibit a relatively flat area 510. FIG. 5 also includes clear indications of doublets 520 in the curves 510.

Figure 6:
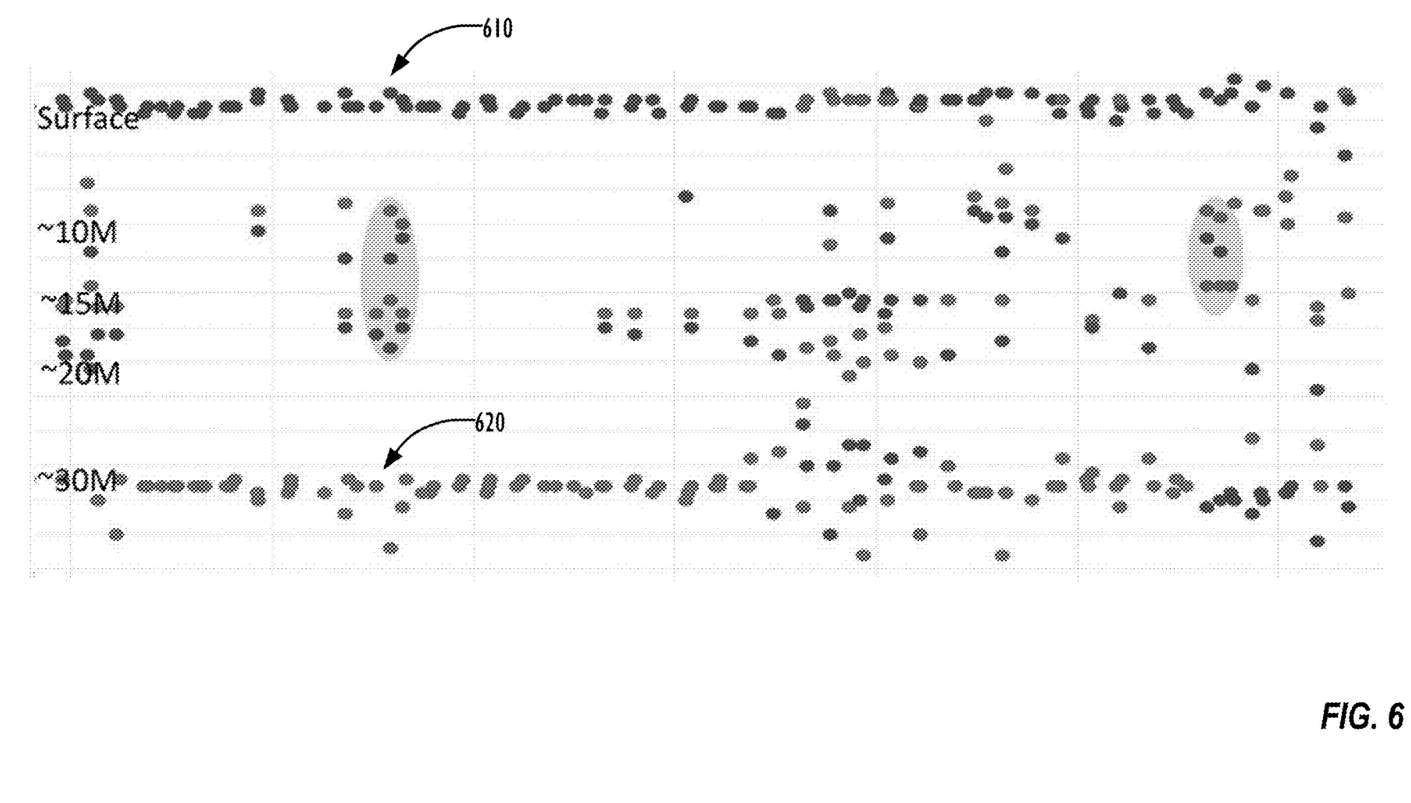
FIG. 6 is a graph illustrating a vertical section of the cross-correlation data with two areas of interest marked. This data can be localized by a 3-step process.
Figure 7:
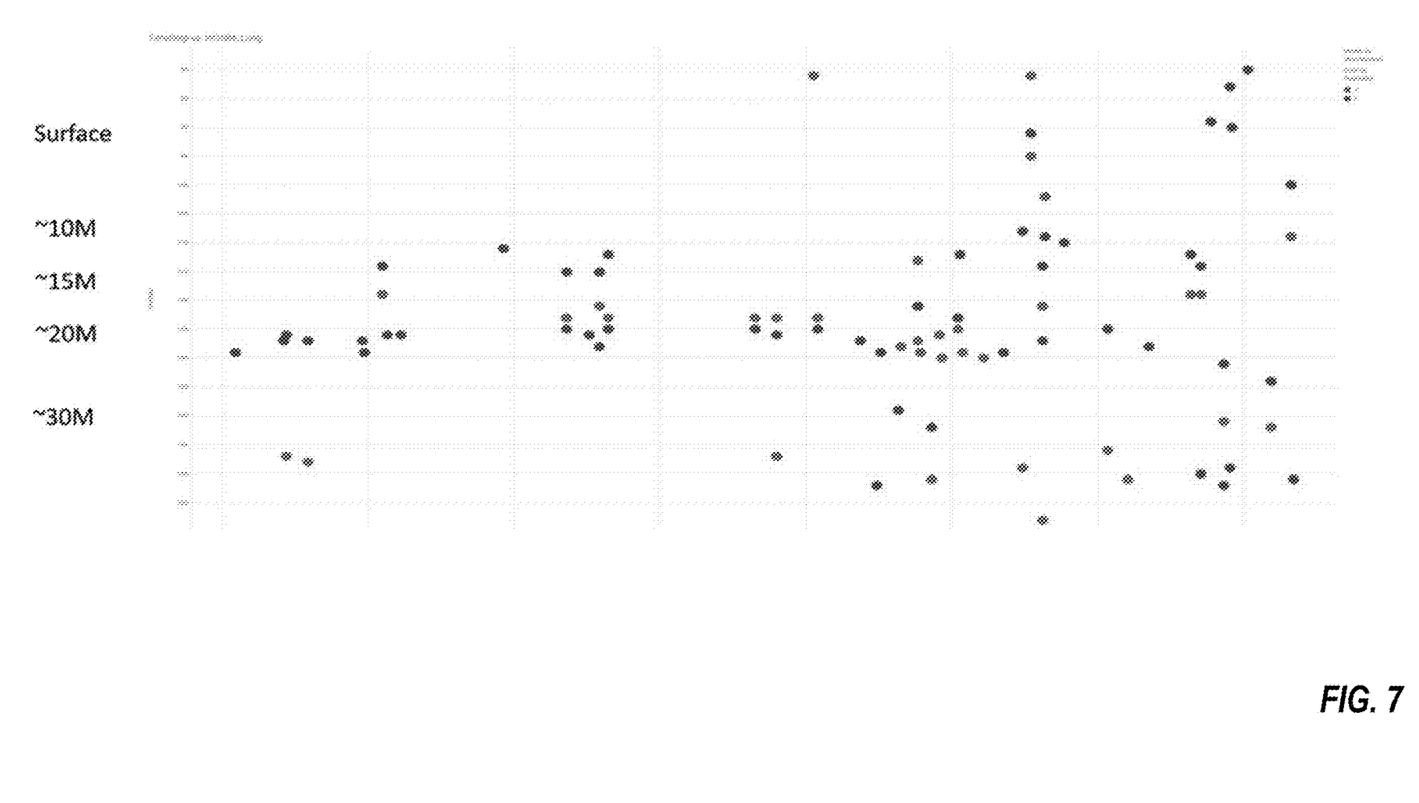
FIG. 7 is a graph illustrating a step of the data localization process: Removal based on peak and valley signal strength—the target is a weak signal.
Figure 8:
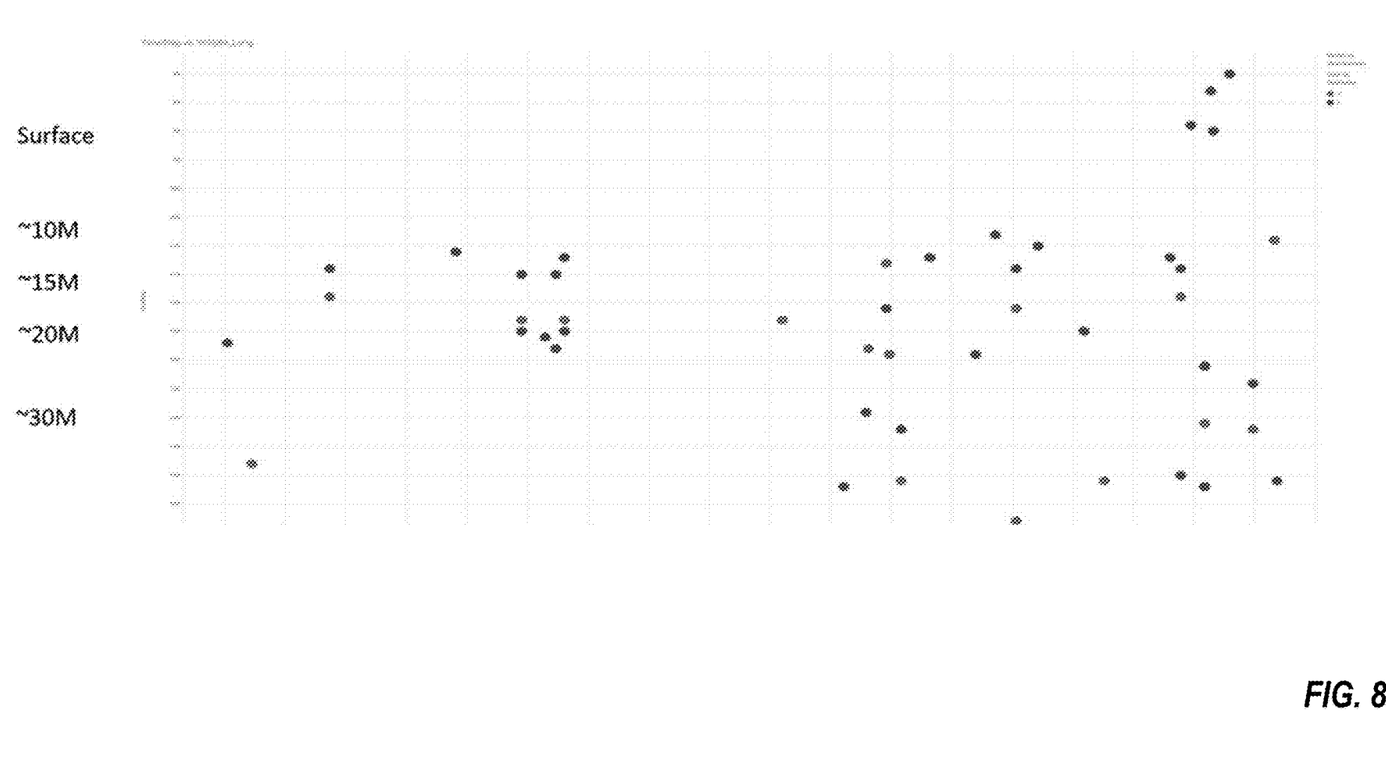
FIG. 8 is a graph illustrating another step of the data localization process. In this step, all doublets with times that exceed an estimated space of 3-meters are removed.
Figure 9:
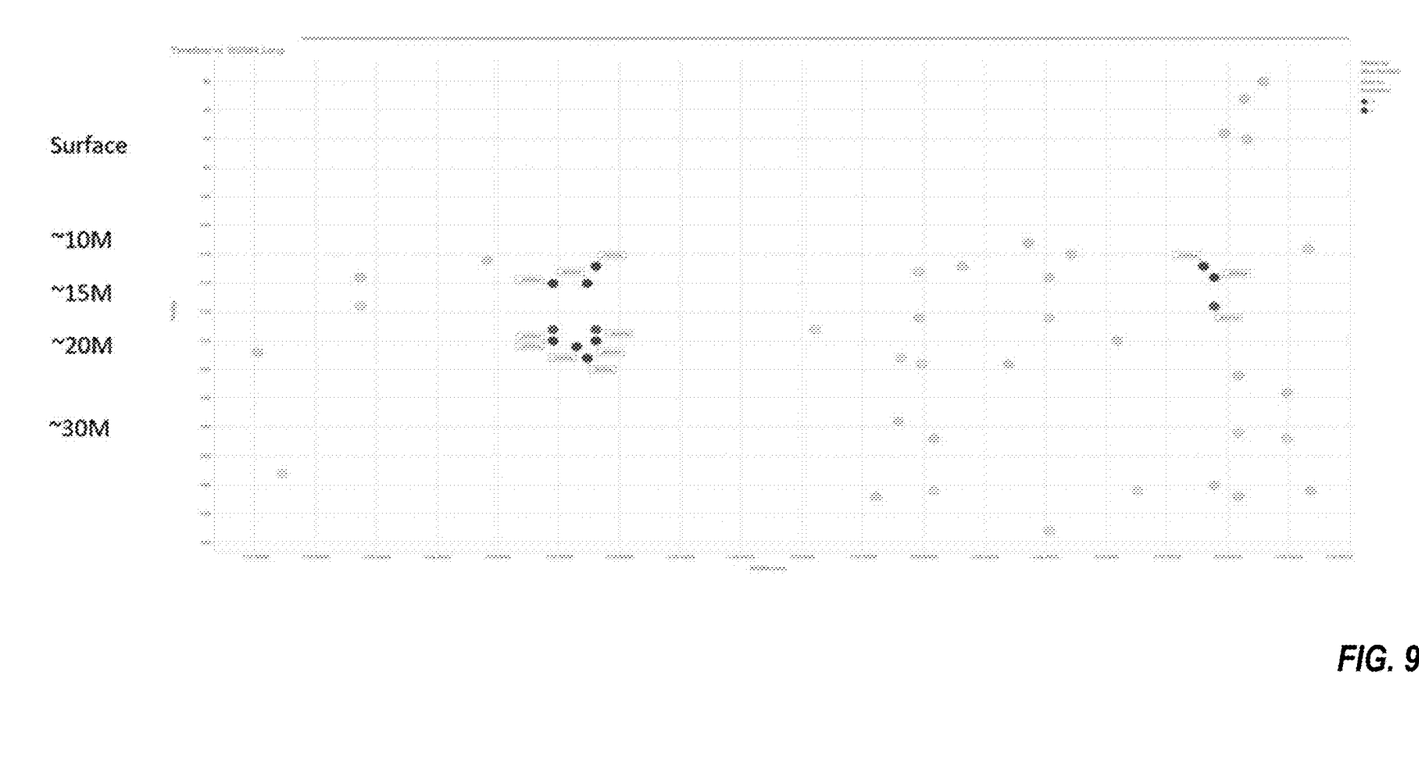
FIG. 9 is a graph illustrating another step of the data localization process: In this step receiver array elements that are co-located in the expected void shape are identified.

The second technique, illustrated in FIGS. 6-9, is quantitative and first removes all large peaks and valleys that are due to large resistivity changes in the subsurface and the airwave. These are generally illustrated in FIG. 6 at 610 and 620. FIG. 7 illustrates the result of this first step. The next step is to remove all doublets that exceed a certain timespan defined from the velocity model, resulting in the illustration of FIG. 8. For example, a 3-meter void would cause a doublet with a shorter time-space than a 10-meter void, so if the expected void is a 3-meter void, a doublet with a longer time-space corresponding to a 10-meter void may be eliminated. Finally, depending on foreknowledge of the void type, a search is done for groups of adjacent doublets that are co-located in time, depth, and spatially relevant response within the A, B, and C array lines. The results are illustrated in FIG. 9. The results in this example revealed the existence of known tunnel 225 of FIG. 2. A previously unknown tunnel 245 of FIG. 2 was also identified and later confirmed. In addition, the doublets indicated in FIG. 9 suggested the presence of an additional tunnel 255 below tunnel 225, the presence of which was later confirmed by the client. The doublets of area 260 also suggested a tunnel, and the presence of a tunnel with a middle section that had been concrete-filled was later confirmed.

Numerous other quantitative methods can be used to analyze this data including ideas such as differential analysis and inversion of the data using a velocity model created from the ERT inverted resistivity data used to provide more accurate depth and orientation information.

While certain example embodiments have been described in detail and shown in the accompanying drawings, it is to be understood that such embodiments are merely illustrative of and not devised without departing from the basic scope thereof, which is determined by the claims that follow.

I claim:

1. A system for detecting voids in a near-subsurface area of the earth, comprising:
   a controlled source electromagnetic transmitter, operatively placed on a surface of the earth, configured to transmit pseudo-random numeric codes that are over 8191 chips long that create a broad spectrum signal that is not coherent with noise sources;
   a plurality of controlled source electromagnetic receivers, synchronized with the controlled source electromagnetic transmitter, operatively distributed across the surface of the earth relative to the controlled source electromagnetic transmitter; and
   software for analyzing signals received by the plurality of controlled source electromagnetic receivers corresponding to signals generated by the controlled source electromagnetic transmitter, comprising:
      software for detecting bi-static doublets in the received signals, comprising:
         software for cross-correlating the signals generated by the controlled source electromagnetic transmitter with the signals received by the plurality of controlled source electromagnetic receivers, producing a cross-correlated data;
         software for detecting peaks and valleys within the cross-correlated data;
         software for sorting the cross-correlated data by significance; and
         software for identifying bi-static doublets in the sorted cross-correlated data; and
      software for identifying near-subsurface voids corresponding to the detected bi-static doublets.

2. The system of claim 1, wherein the software for identifying bi-static doublets in the sorted cross-correlated data comprises:
   software for generating information about a shape and a depth of a subsurface void based upon combinations of positions of bi-static doublets along the plurality of controlled source electromagnetic receivers.

3. The system of claim 1, wherein the software for identifying bi-static doublets in the sorted cross-correlated data comprises:
   software for generating information about a shape and a depth of a subsurface void based upon combinations of timing between bi-static doublets.

4. The system of claim 1, wherein the software for identifying near-subsurface voids corresponding to the detected bi-static doublets comprises:
   software for identifying groups of bi-static doublets that are co-located in time and space.

5. The system of claim 1, wherein the software for analyzing signals received by the plurality of controlled source electromagnetic receivers corresponding to signals generated by the controlled source electromagnetic transmitter further comprises:
   software for creating a velocity model of the near-subsurface area of the earth from an electrical resistivity tomography data.

6. The system of claim 1 wherein the software for identifying near-subsurface voids corresponding to the detected bi-static doublets comprises:
   software for identifying co-located doublets corresponding to a plurality of lines of controlled source electromagnetic receivers.

7. A non-transitory medium on which is stored software for detecting near-subsurface voids in the earth, the software comprising instructions that when executed cause one or more processors to:
   capture signals received by a plurality of controlled source electromagnetic receivers responsive to signals generated by a controlled source electromagnetic transmitter, wherein the signals comprise pseudo-random numeric codes that are over 8191 chips long that create a broad spectrum signal that is not coherent with noise sources;
   detect bi-static doublets in the captured signals, comprising:
      cross-correlate the signals generated by the controlled source electromagnetic transmitter with the signals received by the plurality of controlled source electromagnetic receivers, producing a cross-correlated data;
      detect peaks and valleys within the cross-correlated data;
      sort the cross-correlated data by significance; and
      identify bi-static doublets in the sorted cross-correlated data; and
   identify near-subsurface voids corresponding to the detected bi-static doublets.

8. The non-transitory medium of claim 7, wherein the instructions that when executed cause the one or more processors to identify bi-static doublets in the sorted cross-correlated data comprise instructions that when executed cause the one or more processors to:
   generate information about a shape and a depth of a subsurface void based upon combinations of positions of bi-static doublets along the plurality of controlled source electromagnetic receivers.

9. The non-transitory medium of claim 7, wherein the instructions that when executed cause the one or more processors to identify bi-static doublets in the sorted cross-correlated data comprise instructions that when executed cause the one or more processors to:
generate information about a shape and a depth of a subsurface void based upon combinations of timing between bi-static doublets.

10. The non-transitory medium of claim 7, wherein the instructions that when executed cause the one or more processors to identify near-subsurface voids corresponding to the detected bi-static doublets comprise instructions that when executed cause the one or more processors to:
identify groups of bi-static doublets that are co-located in time and space.

11. The non-transitory medium of claim 7, wherein software for detecting near-subsurface voids in the earth further comprises instructions that when executed cause the one or more processors to:
create a velocity model of the near-subsurface area of the earth from an electrical resistivity tomography data.

12. The non-transitory medium of claim 7, wherein the instructions that when executed cause the one or more processors to identify near-subsurface voids corresponding to the detected bi-static doublets comprise instructions that when executed cause the one or more processors to:
identify co-located doublets corresponding to a plurality of lines of controlled source electromagnetic receivers.

13. A method for detecting near-subsurface voids in the earth, comprising:
positioning a controlled source electromagnetic transmitter on a surface of the earth;
distributing a plurality of controlled source electromagnetic receivers across the surface of the earth relative to the controlled source electromagnetic transmitter, wherein the plurality of controlled source electromagnetic receivers are synchronized with the controlled source electromagnetic transmitter;
generating a first signal into the earth by the controlled source electromagnetic transmitter, wherein the first signal comprises pseudo-random numeric codes that are over 8191 chips long that create a broad spectrum signal that is not coherent with noise sources;
receiving a second signal by the plurality of controlled source electromagnetic receivers responsive to the first signal;
generating a third signal by cross-correlating the second signal to the first signal;
detecting bi-static doublets in the third signal, comprising:
cross-correlating the signals generated by the controlled source electromagnetic transmitter with the signals received by the plurality of controlled source electromagnetic receivers, producing a cross-correlated data;
detecting peaks and valleys within the cross-correlated data;
sorting the cross-correlated data by significance; and
identifying bi-static doublets in the sorted cross-correlated data; and
identifying near-subsurface voids in the earth corresponding to the bi-static doublets.

14. The method of claim 13, wherein identifying bi-static doublets in the sorted cross-correlated data comprises:
generating information about a shape and a depth of a subsurface void based upon combinations of positions of bi-static doublets along the plurality of controlled source electromagnetic receivers; and
generating information about a shape and a depth of a subsurface void based upon combinations of timing between bi-static doublets.

15. The method of claim 13, wherein identifying near-subsurface voids corresponding to the detected bi-static doublets comprises:
identifying groups of bi-static doublets that are co-located in time and space.

16. The method of claim 13, wherein analyzing signals received by the plurality of controlled source electromagnetic receivers corresponding to signals generated by the controlled source electromagnetic transmitter further comprises:
creating a velocity model of the near-subsurface area of the earth from an electrical resistivity tomography data.

17. The method of claim 13, wherein for identifying near-subsurface voids corresponding to the detected bi-static doublets comprises:
identifying co-located doublets corresponding to a plurality of lines of controlled source electromagnetic receivers.

* * * * *